US009246666B2

(12) United States Patent
Kil

(10) Patent No.: US 9,246,666 B2
(45) Date of Patent: Jan. 26, 2016

(54) SKEW TOLERANT CLOCK RECOVERY ARCHITECTURE

(71) Applicant: Jonggab Kil, El Dorado Hills, CA (US)

(72) Inventor: Jonggab Kil, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/228,029

(22) Filed: Mar. 27, 2014

(65) Prior Publication Data

US 2015/0280896 A1    Oct. 1, 2015

(51) Int. Cl.
*H04L 7/00* (2006.01)
*H04L 7/033* (2006.01)

(52) U.S. Cl.
CPC ............ *H04L 7/0012* (2013.01); *H04L 7/0331* (2013.01)

(58) Field of Classification Search
USPC .................. 375/362, 215, 327, 373, 374, 376
See application file for complete search history.

(56) References Cited

U.S. PATENT DOCUMENTS

| 7,568,137 | B1 | 7/2009 | Kellermann |
| 8,937,994 | B2* | 1/2015 | Amirkhany et al. .......... 375/232 |
| 2009/0092212 | A1 | 4/2009 | Ko |
| 2009/0290671 | A1 | 11/2009 | Rea et al. |
| 2010/0166117 | A1 | 7/2010 | Choi et al. |
| 2010/0272216 | A1 | 10/2010 | Liebowitz et al. |
| 2011/0121814 | A1* | 5/2011 | Uematsu .................. 324/76.11 |
| 2013/0113534 | A1* | 5/2013 | Wachi et al. ................. 327/148 |
| 2014/0254733 | A1* | 9/2014 | Sengoku et al. ............. 375/362 |

OTHER PUBLICATIONS

PCT International Search Report and Written Opinion for PCT/US2015/015661 mailed on May 22, 2015, 10 pages.

* cited by examiner

*Primary Examiner* — Kabir A Timory
(74) *Attorney, Agent, or Firm* — Blakely, Sokoloff, Taylor & Zafman LLP

(57) ABSTRACT

Described is an apparatus which comprises: a comparator unit to receive at least three data signals with respective clock signals embedded in the at least three data signals, the comparator unit to provide first, second, and third clock signals; and a delay unit coupled to the comparator unit, the delay unit to receive the first, second and third clock signals to generate delayed versions of the first, second and third clock signals respectively.

17 Claims, 8 Drawing Sheets

Clock Recovery, with skew, using prior art clock recovery scheme

US 9,246,666 B2

SKEW TOLERANT CLOCK RECOVERY ARCHITECTURE

BACKGROUND

Mobile Industry Processor Interface (MIPI®) Alliance C-PHY® is a high-speed serial interface specification to provide high throughput performance over bandwidth limited channels for connecting to peripherals, including displays and cameras. C-PHY® interface is based on 3-phase symbol encoding technology for delivering high bits per symbol (e.g., 2.28 bits per symbol) over three wire trios.

C-PHY® interface was proposed to increase the efficiency of data rate by encoding and decoding the data using three states of wires (high, mid, and low). C-PHY® interface offers the advantage of jitter tracking since the clock is embedded in every cycle of data transaction. However, there is a significant disadvantage when it comes to the design implementation of C-PHY® interface. For example, skews in the signals delivered over the three wires may cause timing violation using traditional clock recovery circuits when recovering clock embedded in the signals.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
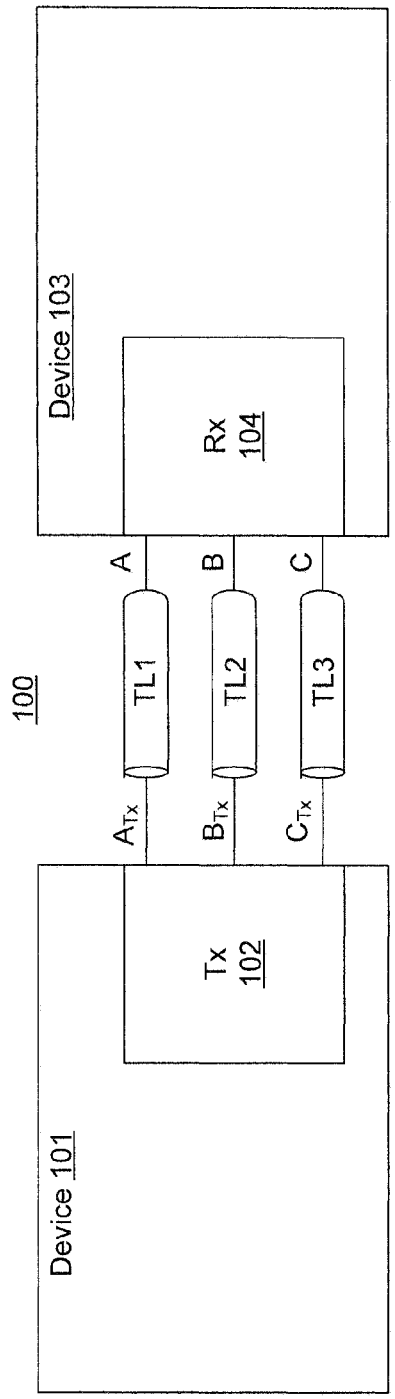
FIG. 1 illustrates a computing system using a skew tolerant clock recovery circuit in a receiver, according to one embodiment of the disclosure.

The embodiments describe a skew tolerant clock recovery circuit and method. Some embodiments cancel out the intra-skew in the input signals received by a receiver. The intra-skew may be caused due to internal routing difference for the three signals, board length mismatch, and board stack-up, etc. Other technical effects will be evident from various embodiments described here.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals.

The transistors also include Tri-Gate and FinFET transistors, Gate All Around Cylindrical Transistors or other devices implementing transistor functionality like carbon nanotubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates a computing system 100 using a skew tolerant clock recovery circuit in a receiver, according to one embodiment of the disclosure. In one embodiment, computing system 100 includes device 101 having transmitter (Tx) 102, device 103 having receiver (Rx) 104, and three transmission lines (TLs) TL1-TL3.

While some embodiments here are described with reference to MIPI® Alliance DRAFT Specification for C-PHY® (e.g., Version 0.7 Revision 02, Published 4 Mar. 2014), the embodiments are not limited to that interface. C-PHY® is based on 3-phase symbol encoding technology for delivering high bits per symbol over three wire trios—TL1, TL2, and TL3. Here, Tx 102 transmits three signals $A_{Tx}$, $B_{Tx}$, and $C_{Tx}$ over the transmission lines to Rx 104. The voltage levels on the three TLs (i.e., TL1, TL2, and TL3) at the input of Rx 104 are $V_A$, $V_B$, and $V_C$, respectively. Here, voltage levels $V_A$, $V_B$, and $V_C$ are also interchangeably referred to as A, B, and C signals, respectively.

A clock recovery circuit may take AB, BC, and CA differential signals and recover the clock whenever first switching happens on A, B, and C signals. Here, AB differential signal represents the difference between signals A and B (i.e., A-B), BC differential signal represents the difference between signals B and C (i.e., B-C), and CA differential signal represents the difference between signals C and A (i.e., C-A). However, skew difference between signals A, B, and/or C may negatively impact the differential data as well as recovered clock at the receiver because skew may not be tractable. To reduce such intra-skew between signals A, B, and/or C is challenging because interconnect carrying these signals may have to be matched to the channel including packages for all of the three wires.

In one embodiment, Rx 104 includes a skew tolerant clock recovery circuit including a comparator unit to receive the three data signals (i.e., A, B, and C signals) with respective clock signals embedded in the at least three data signals. The comparator unit forms the Analog Front End (AFE) of the Rx 104. In one embodiment, the comparator unit provides first ($A_{clk}$), second ($B_{clk}$), and third ($C_{clk}$) clock signals.

In one embodiment, Rx 104 comprises a delay unit (i.e., clock delay unit) coupled to the comparator unit. In one embodiment, the delay unit receives the first, second, and third clock signals to generate delayed versions of the first, second, and third clock signals, respectively. In one embodiment, Rx 104 further comprises a plurality of clock recovery units (CRUs), each of which is coupled to the delay unit and the comparator unit. In one embodiment, the plurality of clock recovery units are used to recover the embedded clock signals. In one embodiment, the plurality of clock recovery units generates the recovered clock signals according to: the first, second, and third clock signals; and the delayed versions of the first, second, and third clock signals. In one embodiment, the recovered clock signals are used to generate a final clock signal (RClk) which samples the data to generate skew compensated data output.

Figure 2:
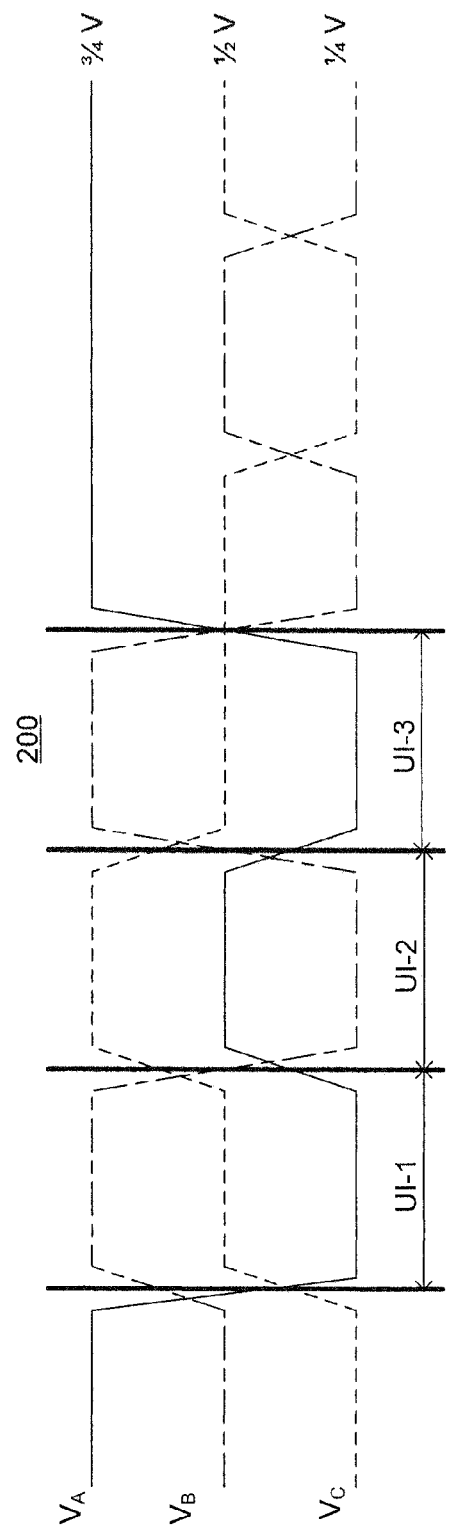
FIG. 2 illustrates a plot showing an example of the three signal-trio.

FIG. 2 illustrates a plot 200 showing an example of the three signal-trio. Here, x-axis is time and y-axis is voltage. It is pointed out that those elements of FIG. 2 having the same reference numbers (or names) as the elements of any other figure can operate or function in any manner similar to that described, but are not limited to such.

The three signals are signals A, B, and C with voltage levels of $V_A$, $V_B$, and $V_C$, respectively. Here, voltages on signals A, B, and C toggle between ¾ V, ½ V and ¼ V, respectively. In each Unit Interval (UI), voltages $V_A$, $V_B$, and $V_C$ of signals A, B, and C, respectively, change. Here, three UIs are labeled as UI-1, UI-2, and UI-3. In one embodiment, for each UI, the embedded clock is recovered and used to sample the data.

Figure 3:
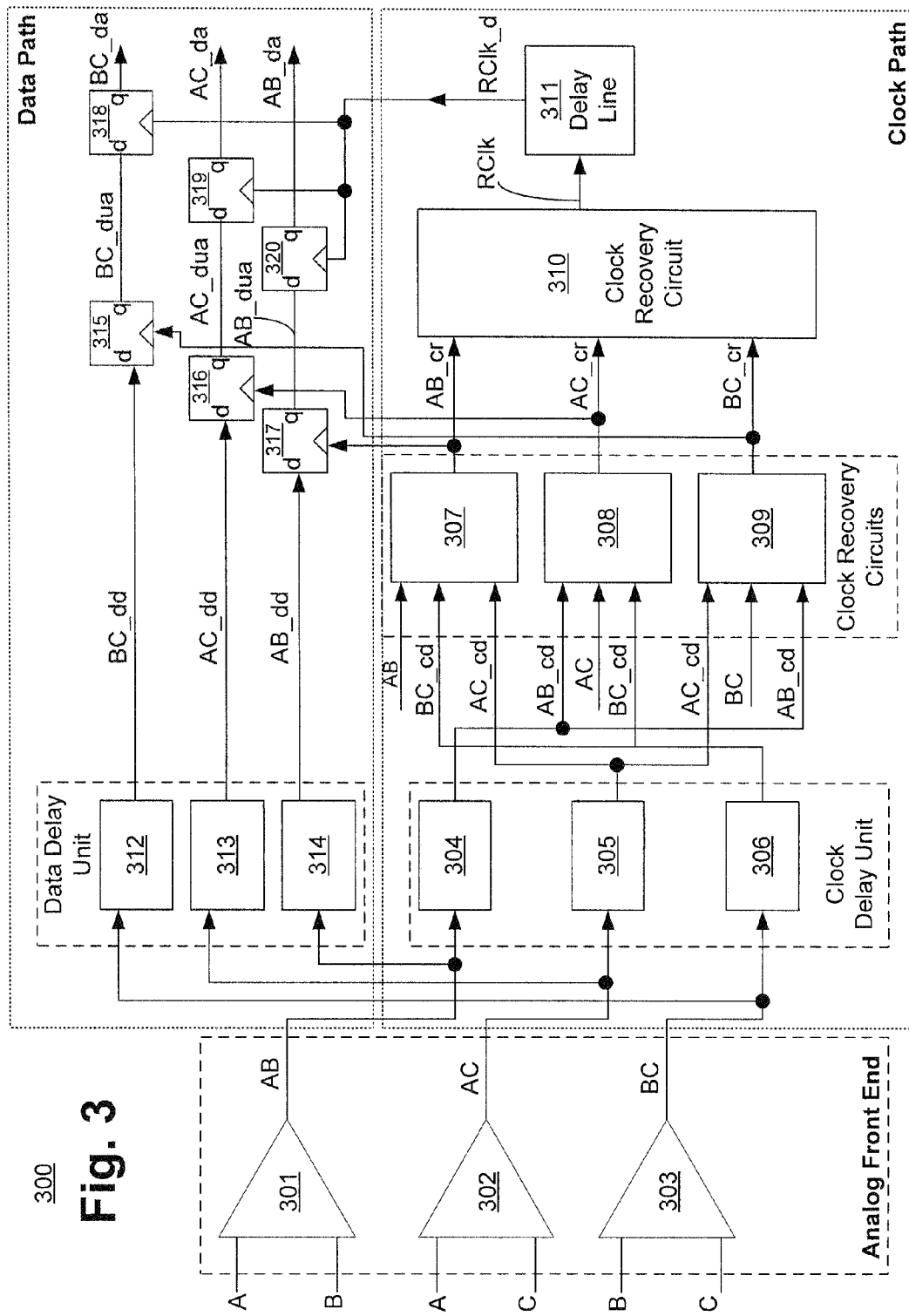
FIG. 3 illustrates a receiver architecture that provides skew tolerant clock recovery, according to one embodiment of the disclosure.

FIG. 3 illustrates Rx architecture 300 (e.g., Rx 104) that provides skew tolerant clock recovery, according to one embodiment of the disclosure. It is pointed out that those elements of FIG. 3 having the same reference numbers (or names) as the elements of any other figure can operate or function in any manner similar to that described, but are not limited to such.

In one embodiment, architecture 300 comprises comparator unit (also referred here as the Analog Front End), Clock Path, and Data Path. In one embodiment, Analog Front End includes comparators 301, 302, and 303. In one embodiment, comparator (or amplifier) 301 compares signals A and B to generate an output AB indicating a difference between signals A and B (i.e., A-B). In one embodiment, comparator (or amplifier) 302 compares signals A and C to generate an output AC indicating a difference between signals A and C (i.e., A-C). In one embodiment, comparator (or amplifier) 303 compares signals B and C to generate an output BC indicating a difference between signals B and C (i.e., B-C).

In one embodiment, the Clock Path includes the skew tolerant clock recovery circuit which provides a receive clock (RClk) which is used to sample data to generate skew compensated data for further processing. In one embodiment, Clock Path includes Clock Delay Unit having delay lines 304, 305, and 306, Clock Recovery Circuits having CRUs 307, 308, and 309, Clock Recovery Circuit 310, and Delay Line 311. In one embodiment, delay lines 304, 305, and 306 are coupled to comparators 301, 302, and 303, respectively.

In one embodiment, delay line 304 receives clock signal AB and provides a delayed version of clock signal AB as AB_cd. In one embodiment, delay line 305 receives clock signal AC and provides a delayed version of clock signal AC as AC_cd. In one embodiment, delay line 306 receives clock signal BC and provides a delayed version of clock signal BC as BC_cd. In one embodiment, delay lines 304, 305, and 306 have programmable delays which can be adjusted by hardware (e.g., fuse) or software. In one embodiment, delay lines 304, 305, and 306 have the same (i.e., equal) propagation delays.

In one embodiment, CRU 307 receives signals AB, BC_cd, and AC_cd to generate recovered clock AB_cr. In one embodiment, CRU 308 receives signals AB_cd, AC, and BC_cd, to generate recovered clock AC_cr. In one embodiment, CRU 309 receives signals AC_cd, BC, and AB_cd, to generate recovered clock BC_cr. In one embodiment, each of the CRUs 307, 308, and 309 select the first crossing of two of its input signals as the recovered clock signal. In one embodiment, CRUs 307, 308, and 309 are implemented as exclusive-OR (XOR) logic gates that select the first crossing of signals A, B, and C within a UI as the recovered clock signal. For example, each current pair (i.e., AB, BC, and AC differential signals) is XORed with a delayed version of each pair (i.e., AB_cd, BC_cd, and AC_cd) to generate recovered clock signals AB_cr, BC_cr, and AC_cr.

In one embodiment, within a UI when data and clock are identified from the crossings of the same input signals (i.e., A, B, and C), then CRU outputs the recovered clock as that clock signal. For example, when data is derived from the first crossing of signals A and B (i.e., AB) and clock is also derived from the next crossing of signals A and B within the same UI, then CRU 307 outputs signal AB as recovered clock AB_cr, else CRU 307 outputs one of the delayed clock signals BC_cd or AC_cd as the recovered clock AB_cr.

In one embodiment, signal BC_cd is selected as recovered clock output signal AB_cr when the clock is not derived from crossing of signals A and C, but is derived from crossing of signals B and C. In one embodiment, signal AC_cd is selected as recovered clock output signal AB_cr when the clock is not derived from crossing of signals A and B, but is derived from crossing of signals A and C i.e., signals AC_cd or BC_cd can be selected depending on which of the two signals BC_cd and AC_cd arrived first. For example, if signal BC_cd arrives before signal AC_cd then signal BC_cd is selected as signal AB_cr when the clock is not derived from crossing of signals A and B signals.

In one embodiment, when data is derived from the first crossing of signals A and C (i.e., AC) and clock is also derived from the next crossing of signals A and C within the same UI, then CRU 308 outputs signal AC as recovered clock signal AC_cr, else CRU 308 outputs one of the delayed clock signals BC_cd or AB_cd as the recovered clock signal AC_cr. In one embodiment, signal BC_cd is selected as recovered clock output signal AC_cr when the clock is not derived from crossing of signals A and C, but is derived from crossing of signals B and C. In one embodiment, signal AB_cd is selected as recovered clock output signal AC_cr when the clock is not derived from crossing of signals A and C, but is derived from crossing of signals A and B.

In one embodiment, when data is derived from the first crossing of signals B and C (i.e., BC) and clock is also derived from the next crossing of signals B and C within the same UI, then CRU 309 outputs signal BC as recovered clock signal BC_cr, else CRU 309 outputs one of the delayed clock signals AC_cd or AB_cd as the recovered clock signal BC_cr. In one embodiment, signal AC_cd is selected as recovered clock output signal BC_cr when the clock is not derived from crossing of signals B and C, but is derived from crossing of signals A and C. In one embodiment, signal AB_cd is selected as recovered clock output signal BC_cr when the clock is not derived from crossing of B and C, but is derived from crossing of signals A and B.

In one embodiment, recovered clocks signals AB_cr, AC_cr, and BC_cr are received by Clock Recovery Circuit 310 that picks the last clock within the UI as the final receive clock signal RClk. For example, if the last crossing of two of the signals A, B, and/or C is a crossing of signals A and B, then signal AB_cr is selected as signal RClk. In one embodiment, if the last crossing of two of the signals A, B, and C is a crossing of signals A and C, then signal AC_cr is selected as signal RClk. In one embodiment, if the last crossing of two of the signals A, B, and C is a crossing of signals B and C, then signal BC_cr is selected as signal RClk. In one embodiment, signal RClk is further delayed by Delay Line 311 to generate a delayed version of signal RClk as signal RClk_d for sampling the unaligned data to generate aligned data which is compensated for skew in signals A, B, and/or C. In one embodiment, delay of Delay Line 311 is equal to the delay of delay lines 304, 305, and 306.

In one embodiment, Data Path comprises Data Delay Unit having delay lines 312, 313, and 314, first set of samplers 315, 316, and 317, and second set of samplers 318, 319, and 320. In one embodiment, delay lines 312, 313, and 314 have programmable delays. In one embodiment, delay lines 314, 313, and 312 delay data signals AB, AC, and BC to generate signals AB_dd, AC_dd, and BC_dd, respectively. In one embodiment, data delay signals BC_dd, AC_dd, and AB_dd are sampled by the first set of samplers 315, 316, and 317, respectively, by recovered clock signals BC_cr, AC_cr, and AB_cr, respectively. In one embodiment, the first set of samplers 315, 316, and 317 are data flip-flops. In other embodiments, other types of sequential units may be used to implement the first set of samplers 315, 316, and 317.

In one embodiment, outputs signal BC_dua, AC_dua, and AB_dua from the first set of samplers 315, 316, and 317, respectively, are unaligned signals because they are sampled by different clock signals. In such an embodiment, output signals BC_dua, AC_dua, and AB_dua are further sampled by the second set of samples 318, 319, and 320, respectively, using clock signal RClk_d to generate data signals BC_da, AC_da, and AB_da, respectively, which are aligned to a single clock signal RClk_d. In this embodiment, data signals BC_da, AC_da, and AB_da are tolerant from skew in input signals A, B, and C. In one embodiment, the second set of samplers 318, 319, and 320 are data flip-flops. In other embodiments, other types of sequential units may be used to implement the second set of samplers 318, 319, and 320.

Figure 4:
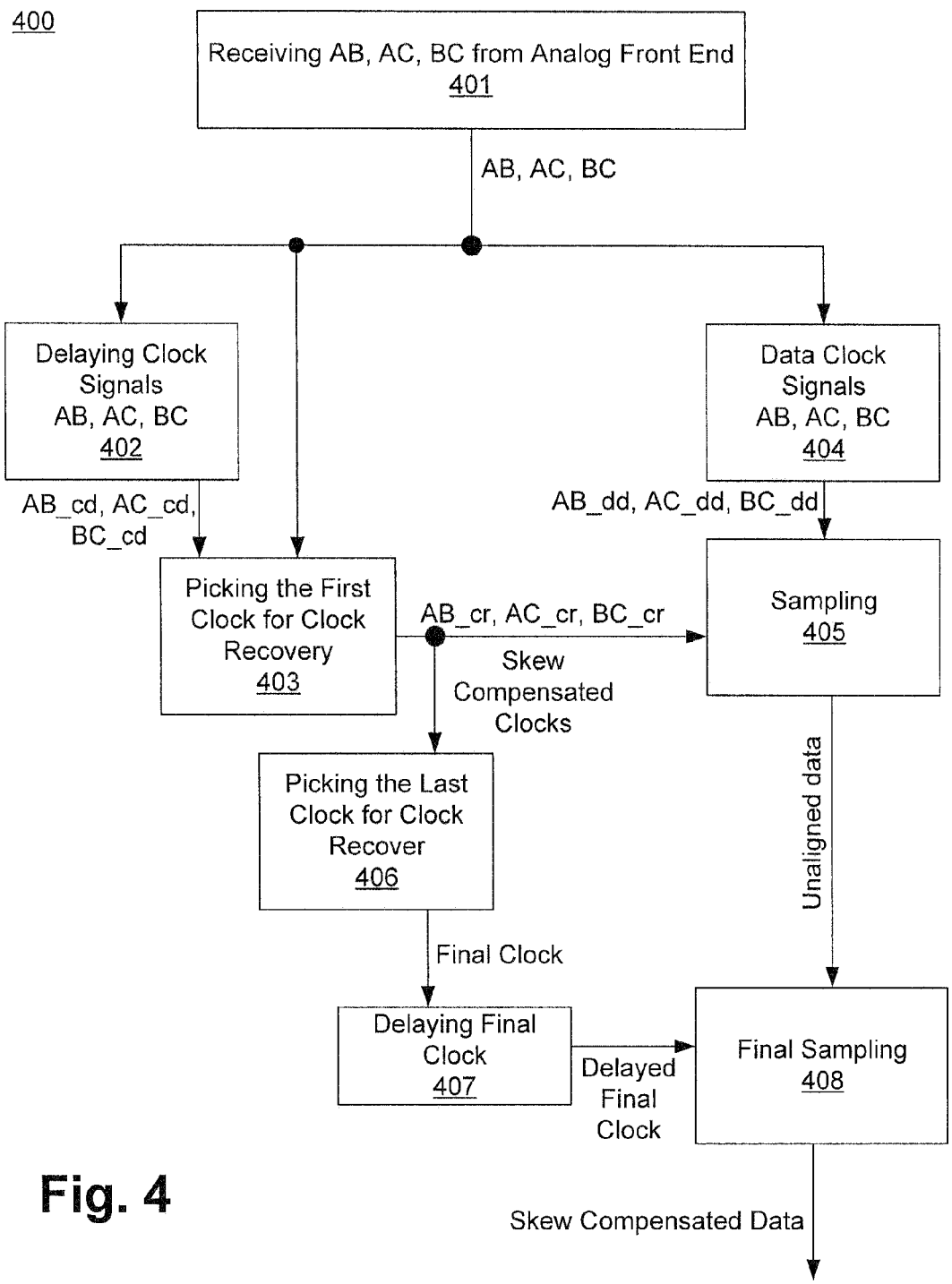
FIG. 4 illustrates a method flowchart for providing skew tolerant clock recovery, according to one embodiment of the disclosure.

FIG. 4 illustrates a method flowchart 400 for providing skew tolerant clock recovery, according to one embodiment of the disclosure. It is pointed out that those elements of FIG. 4 having the same reference numbers (or names) as the elements of any other figure can operate or function in any manner similar to that described, but are not limited to such. Although the blocks in the flowcharts with reference to FIG. 4 are shown in a particular order, the order of the actions can be modified. Thus, the illustrated embodiments can be performed in a different order, and some actions/blocks may be performed in parallel. Some of the blocks and/or operations listed in FIG. 4 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 401 AFE receives signals A, B, and C and generates differential signals AB, AC, and BC which are then provided to the Clock and Data Paths as shown in architecture 400. In blocks 402, 403, 406, and 407, differential signals AB, AC, and BC are analyzed to determine the embedded clocks in signals A, B, and C. In blocks 404, 405, and 408, differential signals AB, AC, and BC are analyzed to determine the embedded clocks in signals A, B, and C. At block 402, signals AB, AC, and BC (also referred with reference to blocks 403, 406, and 407 as differential clock signals) are delayed by delay lines 304-306 to generate signals AB_cd, AC_cd, and BC_cd.

At block 403, Clock Recovery Circuits pick the first clock within a UI for recovering clock as discussed with reference to CRUs 307-309 of FIG. 3 to generate recovered clocks signals AB_cr, AC_cr, and BC_cr. Clock signals AB_cr, AC_cr, and BC_cr are compensated for skew in input signals A, B, and/or C. At block 406, the recovered clock signals AB_cr, AC_cr, and BC_cr are received by Clock Recovery Circuit 310 that picks the last clock in the UI as the Final Clock signal RClk. At block 407, the Final Clock signal RClk is delayed by Delay Line 311 to generate Delayed Final Clock signal RClk_d which is used for sampling the data.

At block 404, AB, AC, and BC (also referred with reference to blocks 405 and 408 as differential data signals) are delayed by delay lines 312-314 to generate signals AB_dd, AC_dd, and BC_dd. At block 405, signals AB_dd, AC_dd, and BC_dd are sampled by first set of samplers using clock signals AB_cr, AC_cr, and BC_cr, respectively, to generate unaligned sampled data. At block 408, the unaligned sampled data is sampled by the second set of samplers using Delayed Final Clock signal RClk_d to generate the Skew Compensated Data.

Figure 5:
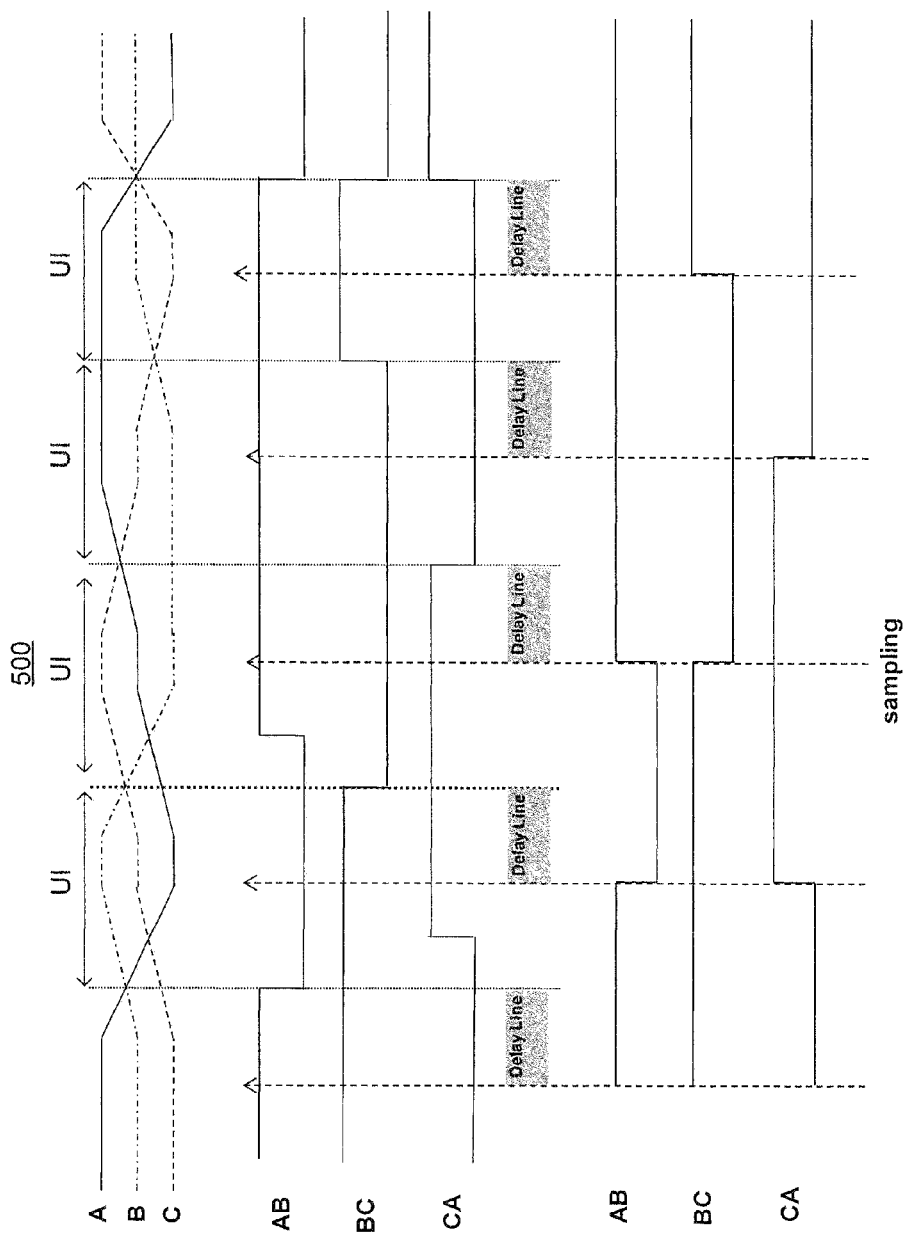
FIG. 5 illustrates a plot showing waveforms associated with clock recovery in the absence of skew.

FIG. 5 illustrates a plot 500 showing waveforms associated with clock recovery in the absence of skew. It is pointed out that those elements of FIG. 5 having the same reference numbers (or names) as the elements of any other figure can operate or function in any manner similar to that described, but are not limited to such. Here x-axis is time and y-axis is voltage.

The three signals from the top are input signals A, B, and C. The three signals below signal C are the differential signals AB, BC, and CA (or AC) from the AFE. The three signals below signal CA are the delayed signals AB, BC, and CA. In this case, input signals A, B, and C have no skew and so the clock recovery is simple in that signals A, B, and C are sampled by the delayed signals AB, BC, and CA according to the first crossing of two of the signals A, B, and/or C.

Figure 6:
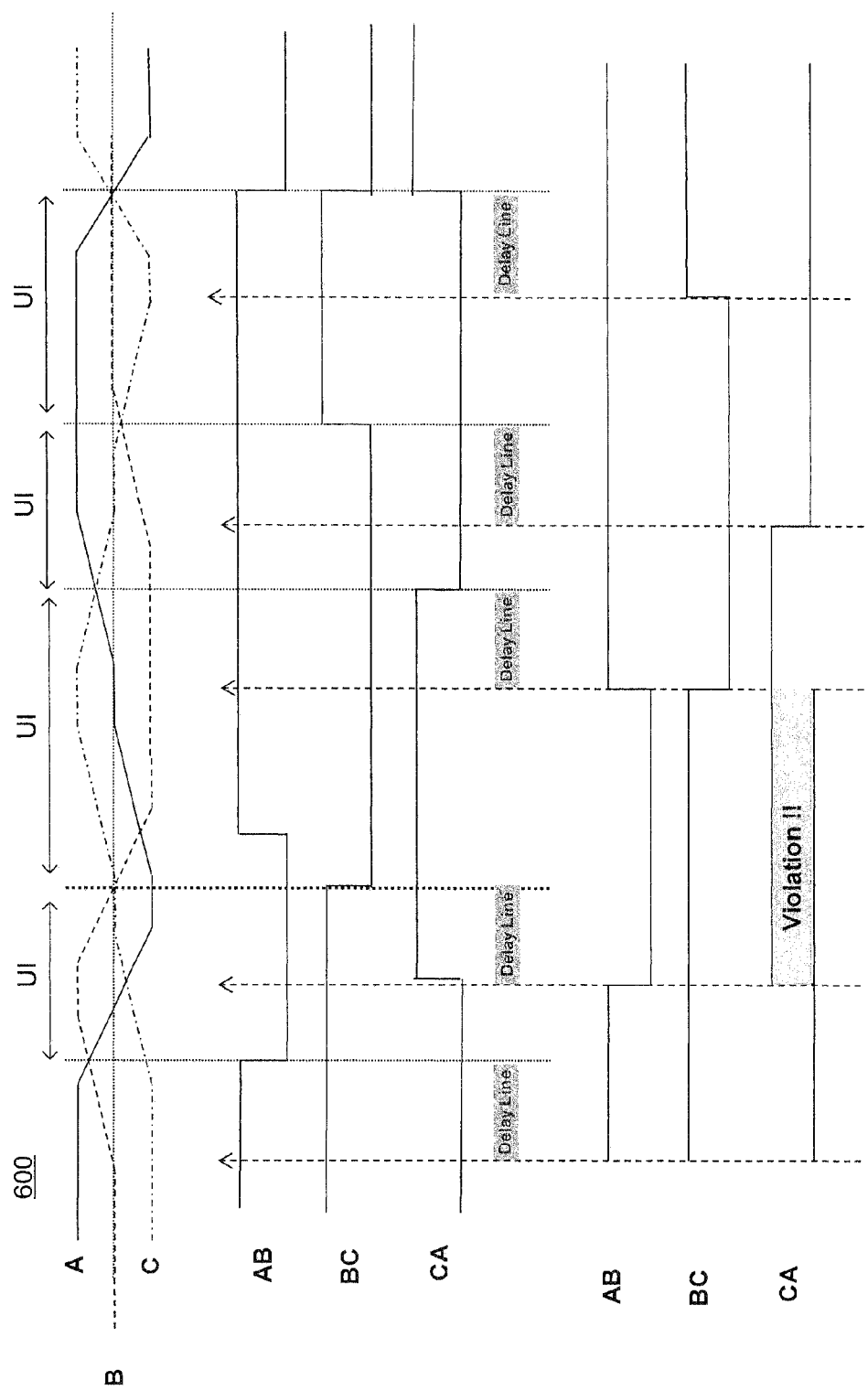
FIG. 6 illustrates a plot showing waveforms associated with clock recovery in the presence of skew and using a prior art clock recovery scheme.

FIG. 6 illustrates a plot 600 showing waveforms associated with clock recovery in the presence of skew and using a prior art clock recovery system. It is pointed out that those elements of FIG. 6 having the same reference numbers (or names) as the elements of any other figure can operate or function in any manner similar to that described, but are not limited to such. Here x-axis is time and y-axis is voltage.

The three signals from the top are input signals A, B, and C. The three signals below signal C are the differential signals AB, BC, and CA (or AC) from the AFE. The three signals below signal CA are the delayed signals AB, BC, and CA. In this case, input signal B is skewed relative to signals A and C and so traditional clock recovery that samples the delayed signals AB, BC, and CA according to the first crossing of two of the signals A, B, and/or C results in a timing violation. Here, the arrow is the sampling clock location and the last three pairs (i.e., AB, BC and CA) are captured based on the one recovered clock which is coming from the first switching of the three pairs. In this case, the last CA signal in plot 600 (i.e., the bottom most waveform) fails to achieve a '1,' and instead a '0' is sampled which is a sampling violation. This situation is resolved by the embodiments as illustrated by FIG. 7 and FIG. 8.

Figure 7:
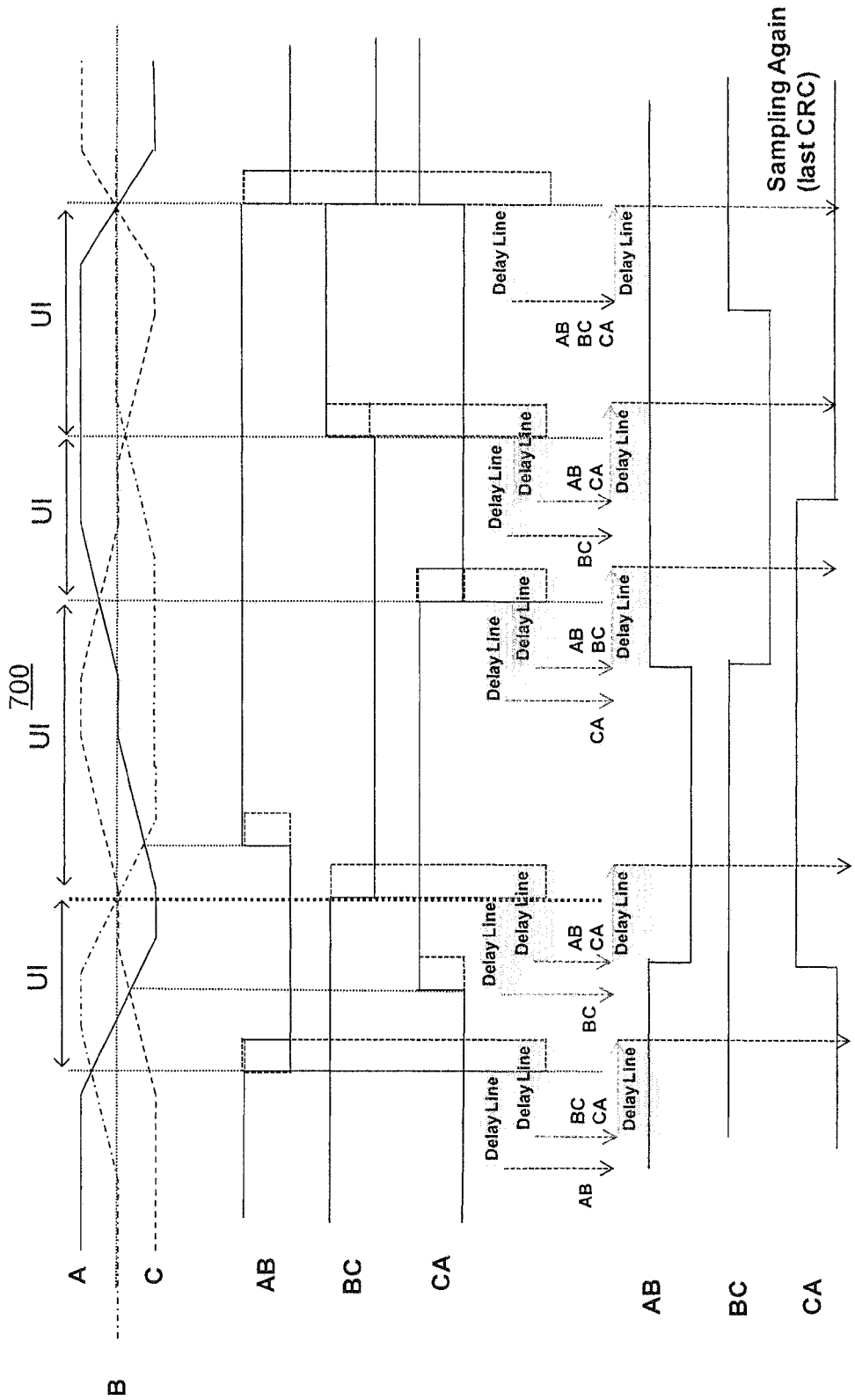
FIG. 7 illustrates a plot showing waveforms associated with the operation of skew tolerant clock recovery scheme when one of the three input signals arrives early relative the to the other two signals, according to one embodiment of the disclosure.

FIG. 7 illustrates a plot 700 showing waveforms associated with the operation of skew tolerant clock recovery scheme when one of the three signals arrives early relative the to the other two signals, according to one embodiment of the disclosure. It is pointed out that those elements of FIG. 7 having the same reference numbers (or names) as the elements of any other figure can operate or function in any manner similar to that described, but are not limited to such. Here x-axis is time and y-axis is voltage.

The three signals from the top are input signals A, B, and C. The three signals below signal C are the differential signals AB, BC, and CA (or AC) from the AFE. The three signals below signal CA are the delayed signals AB, BC, and CA. In this case, input signal B is skewed relative to signals A and C. Unlike the prior art, more selection for clock signals is available to sample the individual pairs (i.e., AB, BC and CA data signals). Here, the original clock as well as the delayed version of that clock is generated. For example, first data differential pair signal CA from the top in plot 700 does not include the clock, so CA data signal borrows a clock from the other differential pairs which are delayed versions of the borrowed clock signal. In this example, signal BC_cd (i.e., a delayed clock) is picked and this clock opens up the setup time to sample the data '1' without violation.

Figure 8:
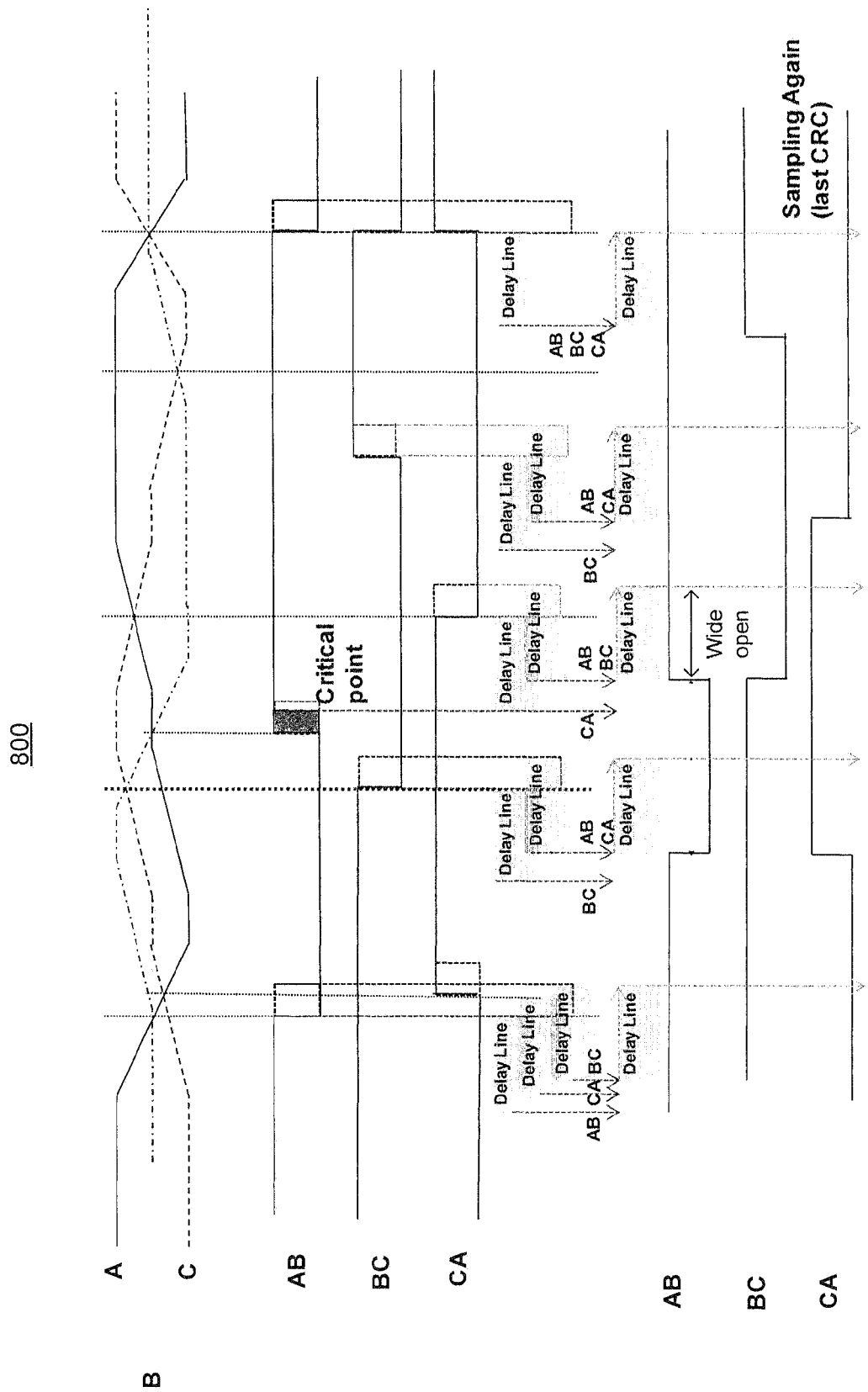
FIG. 8 illustrates a plot showing waveforms associated with the operation of skew tolerant clock recovery scheme when one of the three input signals arrives late relative to the other two signals, according to one embodiment of the disclosure.

FIG. 8 illustrates a plot 800 showing waveforms associated with the operation of skew tolerant clock recovery scheme when one of the three signals arrives late relative the to the other two signals, according to one embodiment of the disclosure. It is pointed out that those elements of FIG. 8 having the same reference numbers (or names) as the elements of any other figure can operate or function in any manner similar to that described, but are not limited to such. Here x-axis is time and y-axis is voltage.

The three signals from the top are input signals A, B, and C. The three signals below signal C are the differential signals AB, BC, and CA (or AC) from the AFE. The three signals below signal CA are the delayed signals AB, BC, and CA. In this case, input signal B is skewed relative to signals A and C. This example is opposite situation from FIG. 7. Here, when signal B is pushed out, the clock recovery circuit of FIG. 3 operates in the same manner by generating delayed version of the original clock signals. This happens when the data source is different from the clock source. First AB differential data signal from the top in plot 800 may have setup violation because AB data differential pair signal is pushed out. Since AB clock signal is not available, AB data borrows a clock from CA pair with a certain (i.e., predetermined) delay. In this example, the potential setup violation disappears by balancing the setup and hold time from the AB pair from the bottom three pairs AB, BC and CA.

Figure 9:
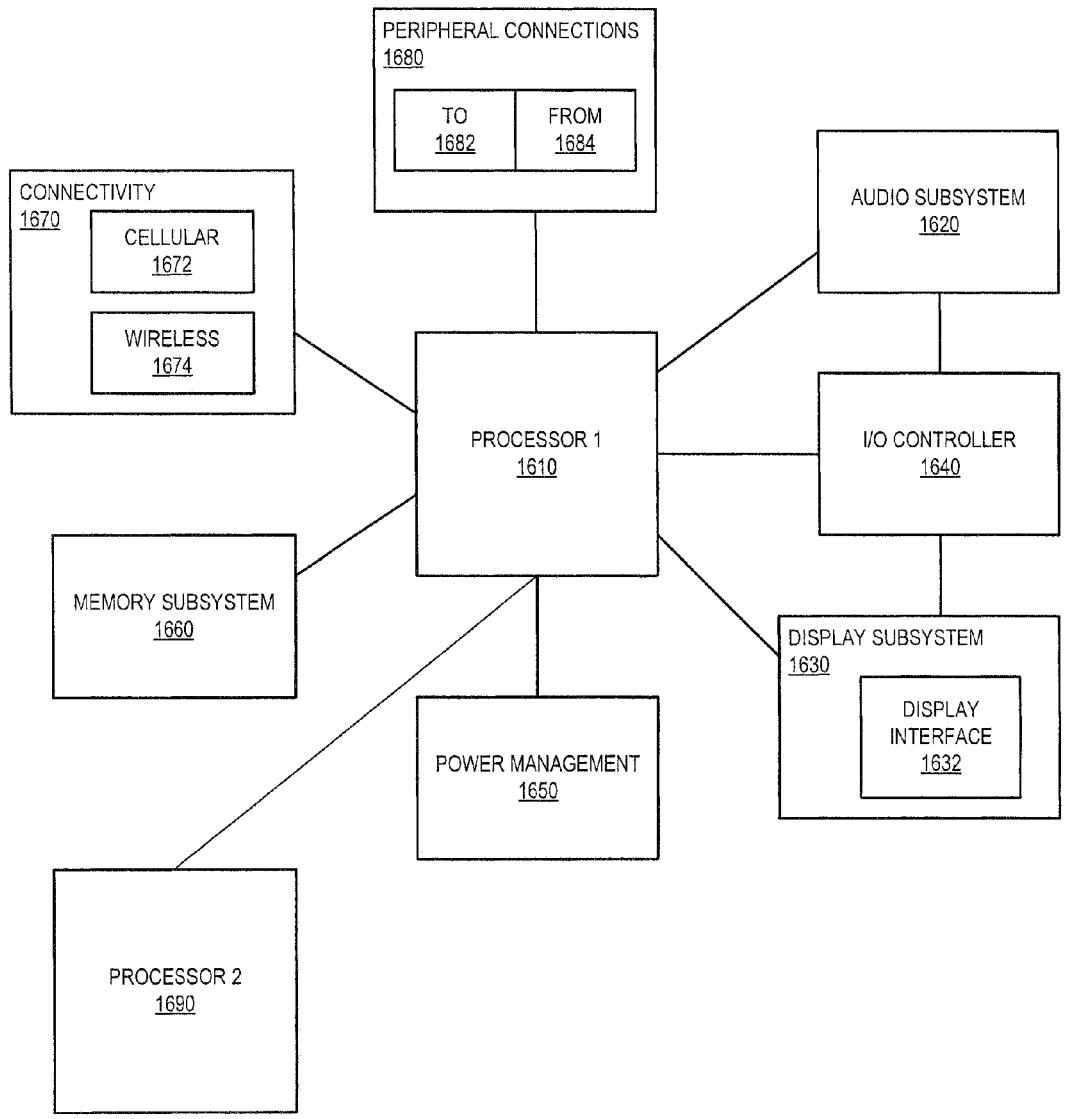
FIG. 9 is a smart device or a computer system or a SoC (System-on-Chip) with the skew tolerant clock recovery circuit, according to one embodiment of the disclosure.

FIG. 9 is a smart device or a computer system or a SoC (System-on-Chip) with the skew tolerant clock recovery circuit, according to one embodiment of the disclosure. It is pointed out that those elements of FIG. 9 having the same reference numbers (or names) as the elements of any other figure can operate or function in any manner similar to that described, but are not limited to such.

FIG. 9 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 apparatus with the skew tolerant clock recovery circuit described with reference to embodiments. Other blocks of the computing device 1600 may also include apparatus with the skew tolerant clock recovery circuit described with reference to embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. Processor 1690 may be optional. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a comparator unit to receive at least three data signals with respective clock signals embedded in the at least three data signals, the comparator unit to provide first, second, and third clock signals; and a delay unit coupled to the comparator unit, the delay unit to receive the first, second and third clock signals to generate delayed versions of the first, second and third clock signals respectively.

In one embodiment, the apparatus further comprises a plurality of clock recovery units, each of which is coupled to the delay unit and the comparator unit. In one embodiment, the plurality of clock recovery units to recover the embedded clock signals, for sampling the at least three data signals, according to: the first, second, and third clock signals; and the delayed versions of the first, second and third clock signals. In one embodiment, the at least three data signals are first, second and third data signals, and wherein the comparator unit comprises: a first comparator to compare the first data signal with the second data signal, the first comparator to generate the first clock signal. In one embodiment, the comparator unit further comprises: a second comparator to compare the first data signal with the third data signal, the second comparator to generate the first clock signal.

In one embodiment, the comparator unit further comprises: a third comparator to compare the second data signal with the third data signal, the third comparator to generate the first clock signal. In one embodiment, the delay unit comprises: a first delay unit to receive the first clock signal and to generate the delayed version of the first clock signal; a second delay unit to receive the second clock signal and to generate the delayed version of the second clock signal; and a third delay unit to receive the third clock signal and to generate the delayed version of the third clock signal.

In one embodiment, the plurality of clock recovery units comprises: a first CDR unit to receive the first clock signal, the delayed version of the second clock signal, and the delayed version of the third clock signal, and to output a first recovered clock. In one embodiment, the plurality of clock recovery units comprises: a second CDR unit to receive the second clock signal, the delayed version of the first clock signal, and the delayed version of the third clock signal, and to output a second recovered clock. In one embodiment, the plurality of clock recovery units comprises: a third CDR unit to receive the third clock signal, the delayed version of the first clock signal, and the delayed version of the second clock signal, and to output a third recovered clock.

In one embodiment, the apparatus further comprises first, second, and third data delay units to delay first, second, and third clock signals respectively to generate first, second, and third delayed data signals respectively. In one embodiment, the apparatus further comprises first, second, and third sampling units to sample first, second, and third delayed data signals respectively using first, second, and third recovered clocks respectively. In one embodiment, the apparatus further comprises a fourth CDR unit to receive the first, second, and third recovered clocks and to generate a fifth clock to sample outputs of the first, second, and third sampling units.

In another example, a method is provided which comprises: comparing at least three data signals with one another, the at least three data signals with respective clock signals embedded in the at least three data signals; providing first, second, and third clock signals in response to comparing; and delaying by a delay unit the first, second, and third clock signals to generate delayed versions of the first, second, and third clock signals respectively. In one embodiment, the method further comprises: identifying, first in time, voltage crossing time point of any two of the first clock signal, delayed version of second clock signal, and delayed version of third clock signal; and generating a first recovered clock signal according to the identified first in time voltage crossing point of any two of first clock signal, delayed version of second clock signal, and delayed version of third clock signal.

In one embodiment, the method further comprises: identifying, first in time, voltage crossing time point of any two of the delayed version of first clock signal, second clock signal, and delayed version of third clock signal; and generating a second recovered clock signal according to the identified first in time voltage crossing point of any two of the delayed version of first clock signal, second clock signal, and delayed version of third clock signal. In one embodiment, the method further comprises: identifying, first in time, voltage crossing time point of any two of the delayed version of first clock signal, delayed version of second clock signal, and the third clock signal; and generating a second recovered clock signal according to the identified first in time voltage crossing point of any two of the delayed version of first clock signal, second clock signal, and delayed version of third clock signal. In one embodiment, the method further comprises: delaying first, second, and third clock signals to generate first, second, and third delayed data signals respectively; and sampling the first, second, and third delayed data signals by the first, second, and third recovered clock signals.

In another example, a system is provided which comprises: a memory; a processor coupled to the memory, the processor comprising a receiver according to the apparatus discussed above; and a wireless interface for allowing the processor to communicate with another device. In one embodiment, the system further comprises a display unit. In one embodiment, the display unit is a touch screen. In one embodiment, the receiver is a C-PHY MIPI® compliant receiver.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
a comparator unit to receive at least three data signals with respective clock signals embedded in the at least three data signals, the comparator unit to provide first, second, and third clock signals;
a delay unit coupled to the comparator unit, the delay unit to receive the first, second, and third clock signals to generate delayed versions of the first, second, and third clock signals respectively; and
a plurality of clock recovery units, each of which is coupled to the delay unit and the comparator unit, the plurality of clock recovery units to recover the embedded clock signals, for sampling the at least three data signals, according to:
the first, second, and third clock signals; and
the delayed versions of the first, second, and third clock signals.

2. The apparatus of claim 1, wherein the at least three data signals are first, second and third data signals, and wherein the comparator unit comprises:
a first comparator to compare the first data signal with the second data signal, the first comparator to generate the first clock signal.

3. The apparatus of claim 2, wherein the comparator unit further comprises:
a second comparator to compare the first data signal with the third data signal, the second comparator to generate the second clock signal.

4. The apparatus of claim 3, wherein the comparator unit further comprises:
a third comparator to compare the second data signal with the third data signal, the third comparator to generate the third clock signal.

5. The apparatus of claim 4, wherein the delay unit comprises:
a first delay unit to receive the first clock signal and to generate the delayed version of the first clock signal;
a second delay unit to receive the second clock signal and to generate the delayed version of the second clock signal; and
a third delay unit to receive the third clock signal and to generate the delayed version of the third clock signal.

6. The apparatus of claim 5, wherein the plurality of clock recovery units comprises:
a first CDR unit to receive the first clock signal, the delayed version of the second clock signal, and the delayed version of the third clock signal, and to output a first recovered clock.

7. The apparatus of claim 6, wherein the plurality of clock recovery units comprises:
a second CDR unit to receive the second clock signal, the delayed version of the first clock signal, and the delayed version of the third clock signal, and to output a second recovered clock.

8. The apparatus of claim 7, wherein the plurality of clock recovery units comprises:
a third CDR unit to receive the third clock signal, the delayed version of the first clock signal, and the delayed version of the second clock signal, and to output a third recovered clock.

9. The apparatus of claim 8 further comprises first, second, and third data delay units to delay first, second, and third clock signals respectively to generate first, second, and third delayed data signals respectively.

10. The apparatus of claim 9 further comprises first, second, and third sampling units to sample first, second, and third delayed data signals respectively using first, second, and third recovered clocks respectively.

11. The apparatus of claim 8 further comprises a fourth CDR unit to receive the first, second, and third recovered clocks and to generate a fifth clock to sample outputs of the first, second, and third sampling units.

12. A method comprising:
comparing at least three data signals with one another, the at least three data signals with respective clock signals embedded in the at least three data signals;
providing first, second, and third clock signals in response to comparing;
delaying by a delay unit the first, second and third clock signals to generate delayed versions of the first, second and third clock signals respectively;
identifying, first in time, voltage crossing time point of any two of the first clock signal, delayed version of second clock signal, and delayed version of third clock signal; and
generating a first recovered clock signal according to the identified first in time voltage crossing point of any two of first clock signal, delayed version of second clock signal, and delayed version of third clock signal.

13. The method of claim 12 further comprises:
identifying, first in time, voltage crossing time point of any two of the delayed version of first clock signal, second clock signal, and delayed version of third clock signal; and
generating a second recovered clock signal according to the identified first in time voltage crossing point of any two of the delayed version of first clock signal, second clock signal, and delayed version of third clock signal.

14. The method of claim 13 further comprises:
identifying, first in time, voltage crossing time point of any two of the delayed version of first clock signal, delayed version of second clock signal, and the third clock signal; and
generating a second recovered clock signal according to the identified first in time voltage crossing point of any two of the delayed version of first clock signal, second clock signal, and delayed version of third clock signal.

15. The method of claim 14 further comprises:
delaying first, second, and third clock signals to generate first, second, and third delayed data signals respectively; and
sampling the first, second, and third delayed data signals by the first, second, and third recovered clock signals.

16. A system comprising:
a memory;
a processor coupled to the memory, the processor comprising a receiver including:
a comparator unit to receive at least three data signals with respective clock signals embedded in the at least three data signals, the comparator unit to provide first, second, and third clock signals; and
a delay unit coupled to the comparator unit, the delay unit to receive the first, second and third clock signals to generate delayed versions of the first, second and third clock signals respectively; and
a plurality of clock recovery units, each of which is coupled to the delay unit and the comparator unit, wherein the plurality of clock recovery units to recover the embedded clock signals, for sampling the at least three data signals, according to:
the first, second, and third clock signals; and the delayed versions of the first, second, and third clock signals a wireless interface for allowing the processor to communicate with another device.

17. The system of claim 16, wherein the receiver is a C-PHY MIPI® compliant receiver.

* * * * *